United States Patent
Kim et al.

(10) Patent No.: US 9,374,718 B2
(45) Date of Patent: Jun. 21, 2016

(54) METHOD AND APPARATUS FOR REPORTING CHANNEL QUALITY INDICATOR IN WIRELESS COMMUNICATION SYSTEM

(75) Inventors: Ki Tae Kim, Anyang-si (KR); Jin Young Chun, Anyang-si (KR); Su Nam Kim, Anyang-si (KR); Ji Won Kang, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 341 days.

(21) Appl. No.: 14/112,867

(22) PCT Filed: Nov. 18, 2011

(86) PCT No.: PCT/KR2011/008824
§ 371 (c)(1),
(2), (4) Date: Nov. 14, 2013

(87) PCT Pub. No.: WO2012/144709
PCT Pub. Date: Oct. 26, 2012

(65) Prior Publication Data
US 2014/0064131 A1    Mar. 6, 2014

Related U.S. Application Data

(60) Provisional application No. 61/477,591, filed on Apr. 20, 2011.

(51) Int. Cl.
*H04B 1/00* (2006.01)
*H04W 24/02* (2009.01)
(Continued)

(52) U.S. Cl.
CPC ............ *H04W 24/02* (2013.01); *H04J 11/005* (2013.01); *H04L 1/0026* (2013.01); *H04L 1/0035* (2013.01); *H04L 2001/0092* (2013.01); *H04W 72/082* (2013.01)

(58) Field of Classification Search
CPC ... H04L 1/0026; H04L 5/0053; H04L 5/0057; H04L 5/0023; H04L 5/0025; H04L 5/0073; H04B 7/0632; H04B 17/309; H04B 17/345; H04B 17/354; H04B 17/373; H04W 24/00; H04W 24/02; H04W 24/04; H04W 24/06; H04W 24/08; H04W 24/10; H04W 52/243; H04W 52/244; H04J 11/0023; H04J 11/0026
USPC ......... 455/63.1, 63.2, 65, 67.13, 226.1–226.4
See application file for complete search history.

(56) References Cited

U.S. PATENT DOCUMENTS

2006/0135169 A1*  6/2006  Sampath ............. H04L 25/0222
                                                          455/447
2008/0039129 A1*  2/2008  Li ........................ H04L 1/0003
                                                          455/522
(Continued)

FOREIGN PATENT DOCUMENTS

WO    WO 2004/051872 A2    6/2004
WO    WO 2005/048031 A2    5/2005
(Continued)

*Primary Examiner* — Thai Hoang
(74) *Attorney, Agent, or Firm* — Birch, Stewart, Kolasch & Birch, LLP

(57) ABSTRACT

Provided are a method and an apparatus for reporting a channel quality indicator (CQI) in a multi-node system. A terminal measures the CQI on the basis of a final interference power in which interference from at least one node among a plurality of nodes, from which the terminal receives signals, is reduced, and reports the measured CQI to a base station. Improvement of system performance, such as a data rate increase can be expected.

3 Claims, 10 Drawing Sheets

(51) Int. Cl.
*H04L 1/00* (2006.01)
*H04J 11/00* (2006.01)
*H04W 72/08* (2009.01)

(56) References Cited

U.S. PATENT DOCUMENTS

| | | | | |
|---|---|---|---|---|
| 2008/0090575 A1* | 4/2008 | Barak | ................ | H04B 7/0417 455/444 |
| 2009/0046573 A1* | 2/2009 | Damnjanovic | ........ | H04W 36/30 370/216 |
| 2010/0035555 A1* | 2/2010 | Bala | ................ | H04B 7/024 455/63.1 |
| 2010/0291940 A1* | 11/2010 | Koo | ................ | H04B 7/024 455/450 |
| 2011/0032835 A1* | 2/2011 | Zhu | ................ | H04L 1/0026 370/252 |
| 2012/0076028 A1* | 3/2012 | Ko | ................ | H04L 1/0026 370/252 |
| 2013/0294352 A1* | 11/2013 | Park | ................ | H04B 7/024 370/328 |
| 2014/0146756 A1* | 5/2014 | Sahin | ................ | H04L 1/0025 370/329 |
| 2014/0286189 A1* | 9/2014 | Kang | ................ | H04B 7/0417 370/252 |
| 2014/0348253 A1* | 11/2014 | Mobasher | ............ | H04B 7/0452 375/267 |

FOREIGN PATENT DOCUMENTS

WO    WO 2006/020339 A2    2/2006
WO    WO 2008/135101 A1    11/2008

* cited by examiner

METHOD AND APPARATUS FOR REPORTING CHANNEL QUALITY INDICATOR IN WIRELESS COMMUNICATION SYSTEM

CROSS REFERENCE TO RELATED APPLICATIONS

This application is the National Phase of PCT/KR2011/008824 filed on Nov. 18, 2011, which claims priority under 35 U.S.C. 119(e) to U.S. Provisional Application No. 61/477,591 filed on Apr. 20, 2011, all of which are hereby expressly incorporated by reference into the present application.

BACKGROUND OF THE INVENTION

1. Field of the Invention

The present invention relates to wireless communications, and more particularly, to a method and apparatus for reporting a channel quality indicator in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

Meanwhile, an inter-cell interference (ICI) problem may occur between respective nodes in a multi-node system. The ICI may have an influence on a femto user equipment (UE) or pico UE served by a femto cell or pico cell having a smaller service coverage from a macro cell in general. 3GPP solves the ICI problem through an enhanced inter-cell interference coordination (eICIC) session.

UE may report a channel quality indicator (CQI) to a BS. The BS may use the CQI received from the UE when scheduling. However, if the CQI is reported by the conventional method in a situation where various techniques are applied to solve the ICI problem, a channel environment improvement gain obtained by solving the ICI problem cannot be directly applied onto a system.

There is a need for an effective CQI reporting method to solve the ICI problem in the multi-node system.

SUMMARY OF THE INVENTION

The present invention provides a method and apparatus for reporting a channel quality indicator (CQI) in a wireless communication system. The present invention also provides a CQI reporting method for effectively avoiding an inter-cell interference which occurs between respective base stations in a network environment in which the base stations having a variety of service coverage co-exist. In addition, the present invention provides a CQI reporting method by which a gain obtained from an inter-cell interference reduction and mitigation technique can be applied onto a system immediately or with a minimum delay.

In an aspect, a method of reporting a channel quality indicator (CQI) by a user equipment in a multi-node system is provided. The method includes measuring the CQI on the basis of final interference power in which an interference from at least one node, among a plurality of nodes from which the user equipment receives a signal, is reduced, and reporting the measured CQI to a base station.

The method may further include receiving from the base station a CQI indicator indicating whether to apply an inter-cell interference (ICI) reduction technique.

The CQI indicator may be 1 bit.

The at least one node of which the interference is reduced may be a single node which causes the strongest interference to the user equipment.

The final interference power in which the interference of the single node is reduced may be $\Sigma I - I_m$, where $\Sigma I$ is total interference power from the plurality of nodes and $I_m$ is the interference of the single node.

The at least one node of which the interference is reduced may be two nodes which cause the strongest interference to the user equipment.

The final interference power in which the interferences of the two nodes are reduced may be $$\sum I - \frac{(I_m + I_n)}{2},$$

where $\Sigma I$ is total interference power from the plurality of nodes and $I_m$, $I_n$ are respectively interferences of the two nodes.

In another aspect, a method of recalculating a channel quality indicator (CQI) by a base station in a wireless communication system is provided. The method includes receiving CQIs from a plurality of user equipments, and recalculating the received CQIs according to whether an inter-cell interference (ICI) reduction technique is applied.

The CQI received from each of the plurality of user equipments may be recalculated by applying the same offset.

The CQI received from each of the plurality of user equipments may be recalculated by applying a different offset according to a channel environment of each of the plurality of user equipments.

The CQI received from each of the plurality of user equipments may be recalculated by applying a different offset according to a serving base station which serves each of the plurality of user equipments.

Improvement of system performance such as an increase in a data transfer rate, etc., can be expected.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LET-A will be largely described, but the technical concept of the present invention is not meant to be limited thereto.

Figure 1:
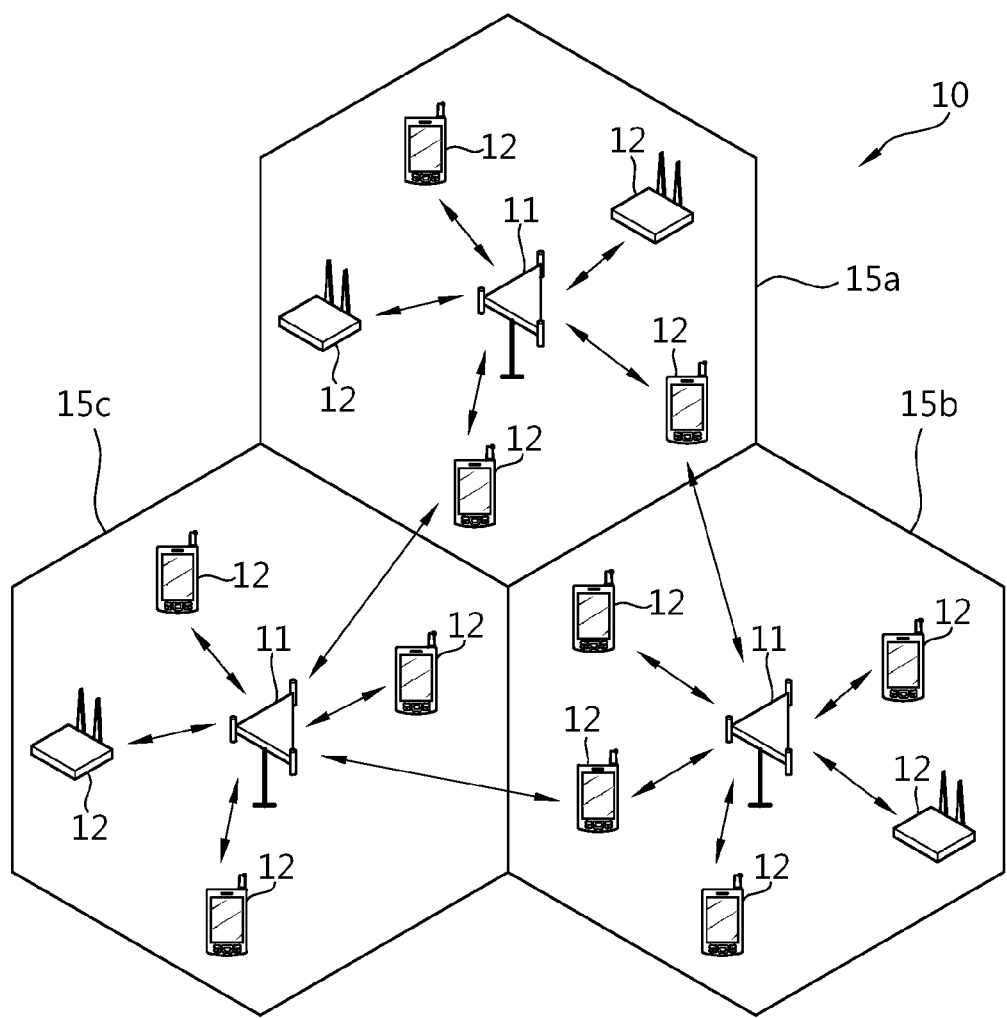
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
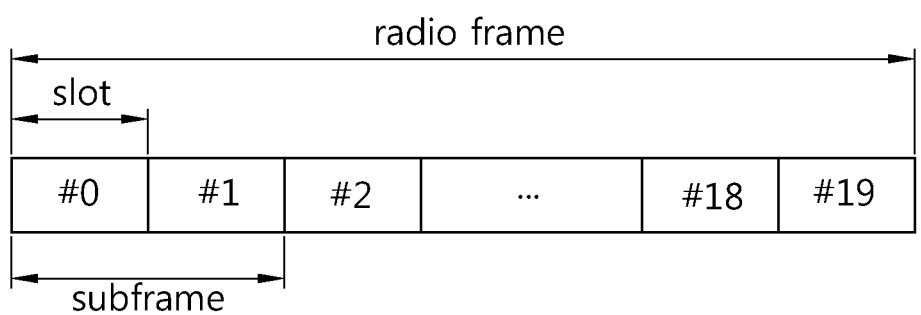
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
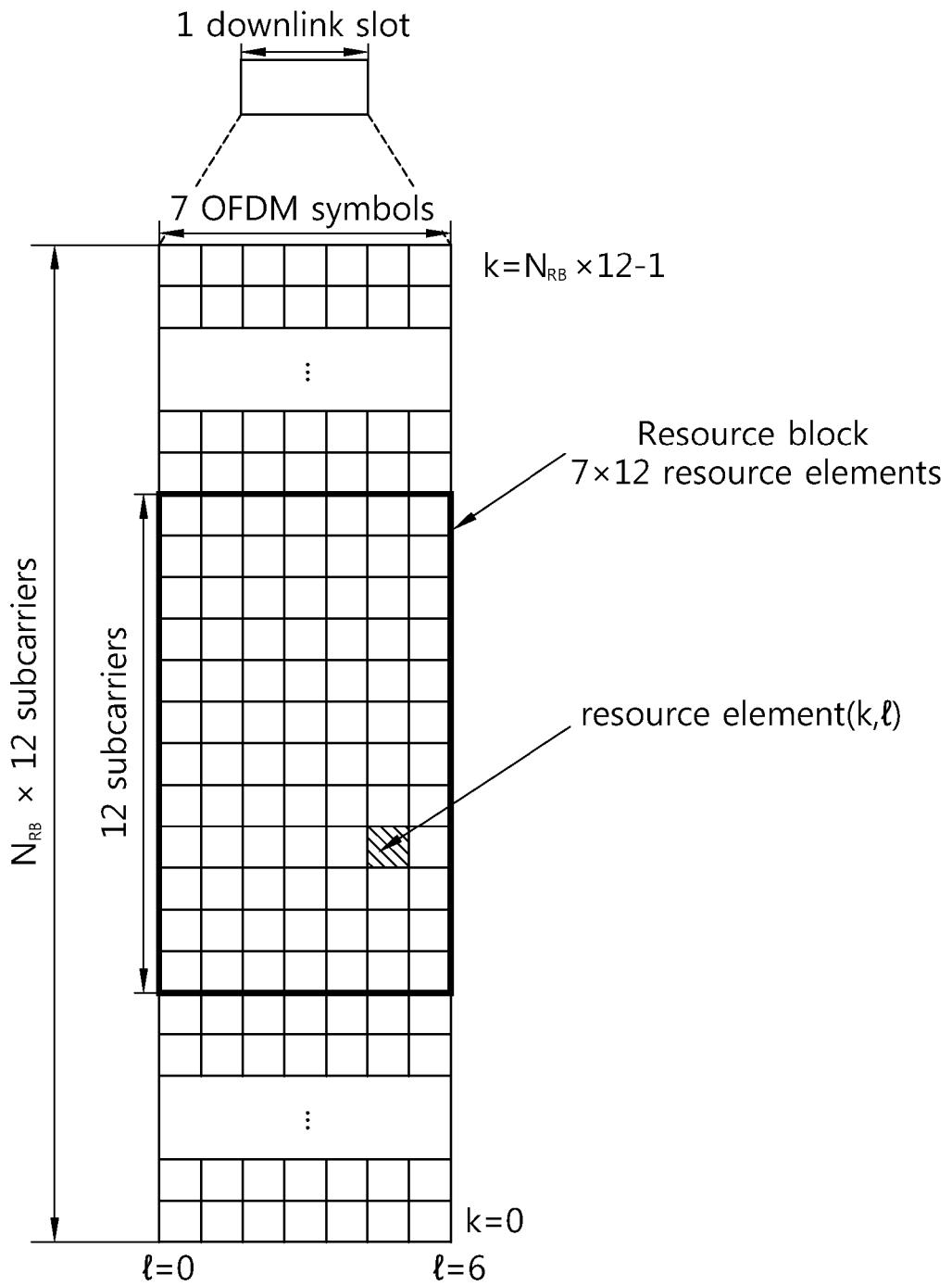
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
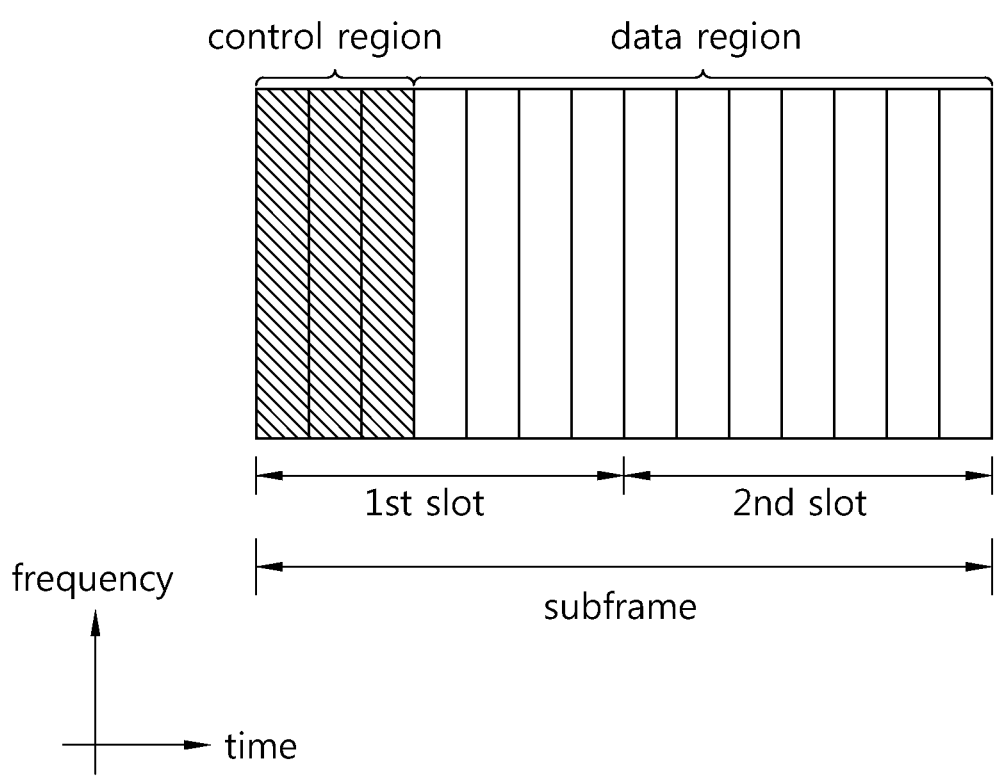
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
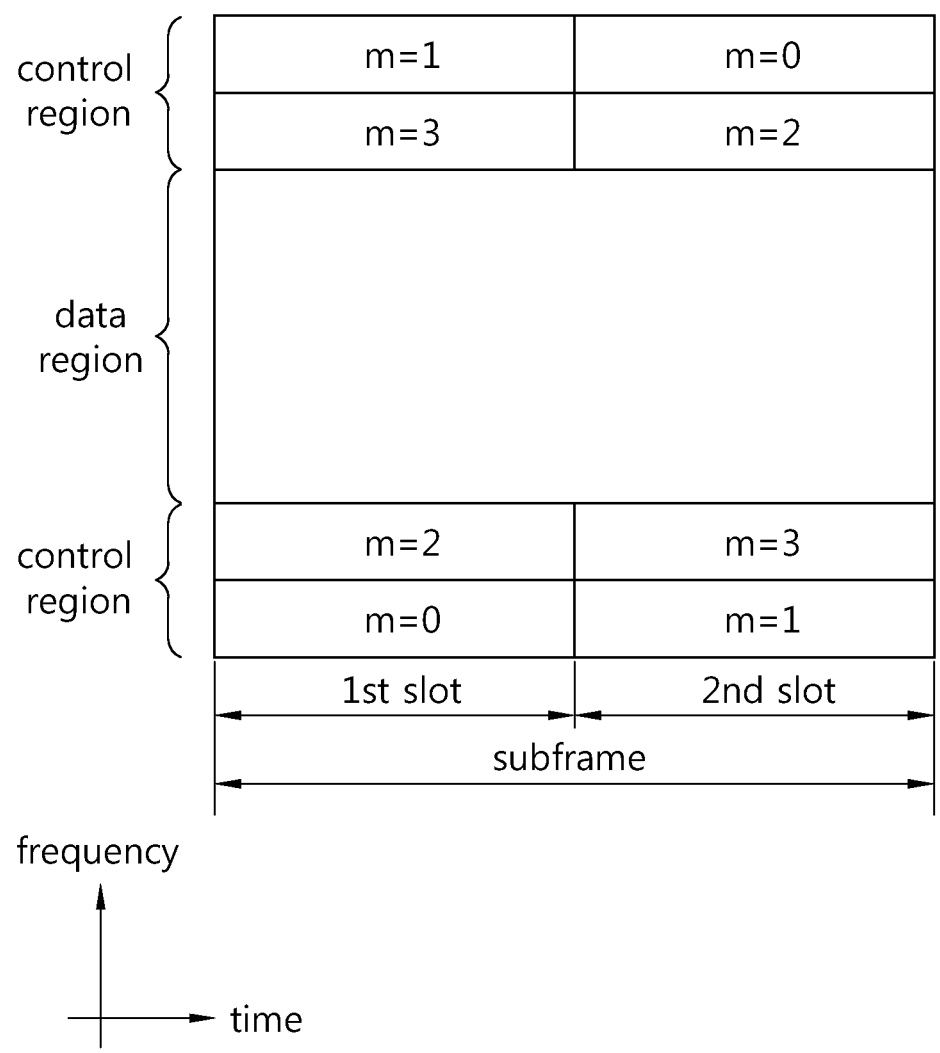
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

In general, a reference signal (RS) is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

The RS may be classified into a cell-specific RS (CRS), a multimedia broadcast and multicast single frequency network (MBSFN) RS, a UE-specific RS, a positioning RS (PRS), and a channel state information (CSI) RS (CSI-RS). The CRS is an RS transmitted to all UEs in a cell, and is used in channel estimation. The MBSFN RS may be transmitted in a subframe allocated for MBSFN transmission. The UE-specific RS is an RS received by a specific UE or a specific UE group in the cell, and may also be called a dedicated RS (DRS). The DRS is primarily used for data demodulation of a specific UE or a specific UE group. The PRS may be used for location estimation of the UE. The CSI-RS is relatively sparely arranged in a frequency domain or a time domain, and may be punctured in a data region of a normal subframe or an MBSFN subframe. If required, a channel quality indicator (CQI), a precoding matrix indicator (PMI), a rank indicator (RI), etc., may be reported from the UE through CSI estimation.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
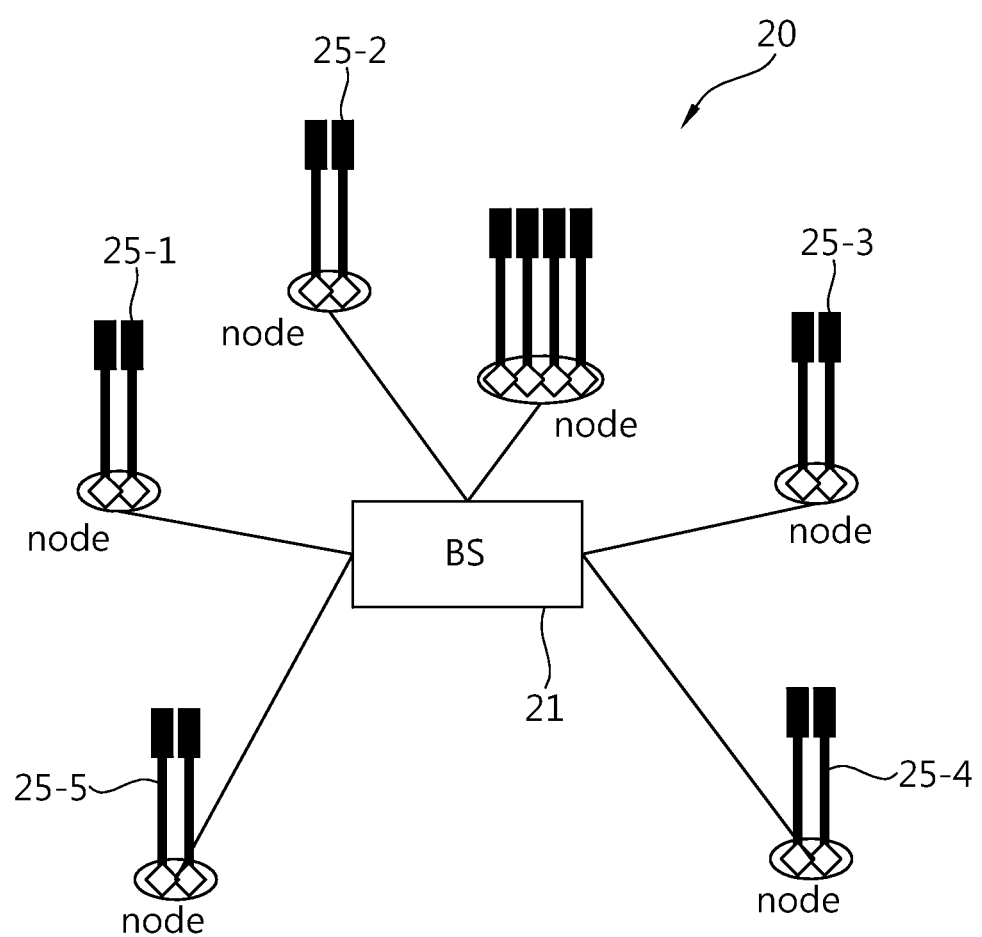
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 can be regarded as a distributed antenna system (DAS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point.

A UE in 3GPP LTE may measure signal strength by using three methods as follows.

1) Reference signal received power (RSRP): It indicates average received power of all REs for carrying a CRS transmitted across a whole band. In this case, average received power of all REs for carrying a CRS RS, instead of the CRS, may be measured.

2) Received signal strength indicator (RSSI): It indicates received power measured at a whole band. The RSSI includes all of a signal, interference, and a thermal noise.

3) Reference symbol received quality (RSRQ): It indicates a CQI, and may be determined as a 'RSRP/RSSI' based on a measurement bandwidth or subband. That is, the RSRQ implies a signal-to-noise interference ratio (SINK). Since the RSRP cannot provide sufficient mobility information, RSRQ may be used instead of the RSRP in a handover or cell reselection procedure. The RSRQ may be determined by Equation 1.

RSRQ(dB)=10×log$_{10}$(No. of RBs in BW)+RSRP(in dB)−RSSI(in dB)  <Equation 1>

Referring to Equation 1, RSRQ may be measured in unit of a subband which is an RB set for measuring a CQI or a corresponding measurement bandwidth.

An inter-cell interference (ICI) problem may occur in a multi-node system. Various techniques are under development to solve the ICI problem. However, even if various ICI reduction techniques are applied, a UE connected to a BS calculates a CQI by using the conventional technique and reports this to the BS irrespective of whether to apply the ICI reduction technique. That is, in the multi-node system, the UE also measures a single CQI without considering multiple nodes and the ICI reduction technique. Accordingly, the UE cannot detect various interference environmental changes caused by the application of the ICI reduction technique, and thus always measures the CQI on the basis of an average ICI.

Meanwhile, the conventional CQI calculation method of 3GPP LTE may be expressed by Equation 2.

$$CQI = f(RSRQ) = f\left(\frac{RSRP}{RSSI}\right) = f\left(\frac{S}{\sum I + N_0}\right) = f(SINR) \quad \text{<Equation 2>}$$

Referring to Equation 2, a CQI is a function of RSRQ, and may be calculated as RSRQ=RSRP/RSSI. In Equation 2, S denotes received signal power, I denotes interference power of other cells, and $N_0$ denotes a thermal noise. As a result, the CQI becomes a function of an SINR. Referring to Equation 2, RSSI in the denominator does not change even if the ICI reduction technique is applied. That is, even if RSSI is decreased and thus the SINR is improved, the RSRQ measured by the UE does not change. Therefore, inevitably, a modulation order is gradually increased even if ACK/NACK of a transmitted packet is all detected as ACK. That is, a gain obtained by ICI reduction cannot be properly applied onto a system according to the conventional CQI measuring/reporting method even if an effective ICI reduction technique is applied, and an extremely long delay may occur even if the gain is applied onto the system.

Hereinafter, the proposed CQI reporting method will be described. In the following descriptions, a node implies an antenna group separated by more than a specific interval in a DAS. That is, it is assumed in the following descriptions that each node implies an RRH in a physical manner. However, the present invention is not limited thereto, and the node may be defined as any antenna group irrespective of a physical interval. For example, the present invention is applicable by considering that a node consisting of horizontal polarized antennas and a node consisting of vertical polarized antennas constitute a BS consisting of a plurality of cross polarized antennas. In addition, the present invention is also applicable to a case where each node is a pico cell or femto cell having smaller cell coverage than a macro cell, that is, applicable to a multi-cell system.

Figure 7:
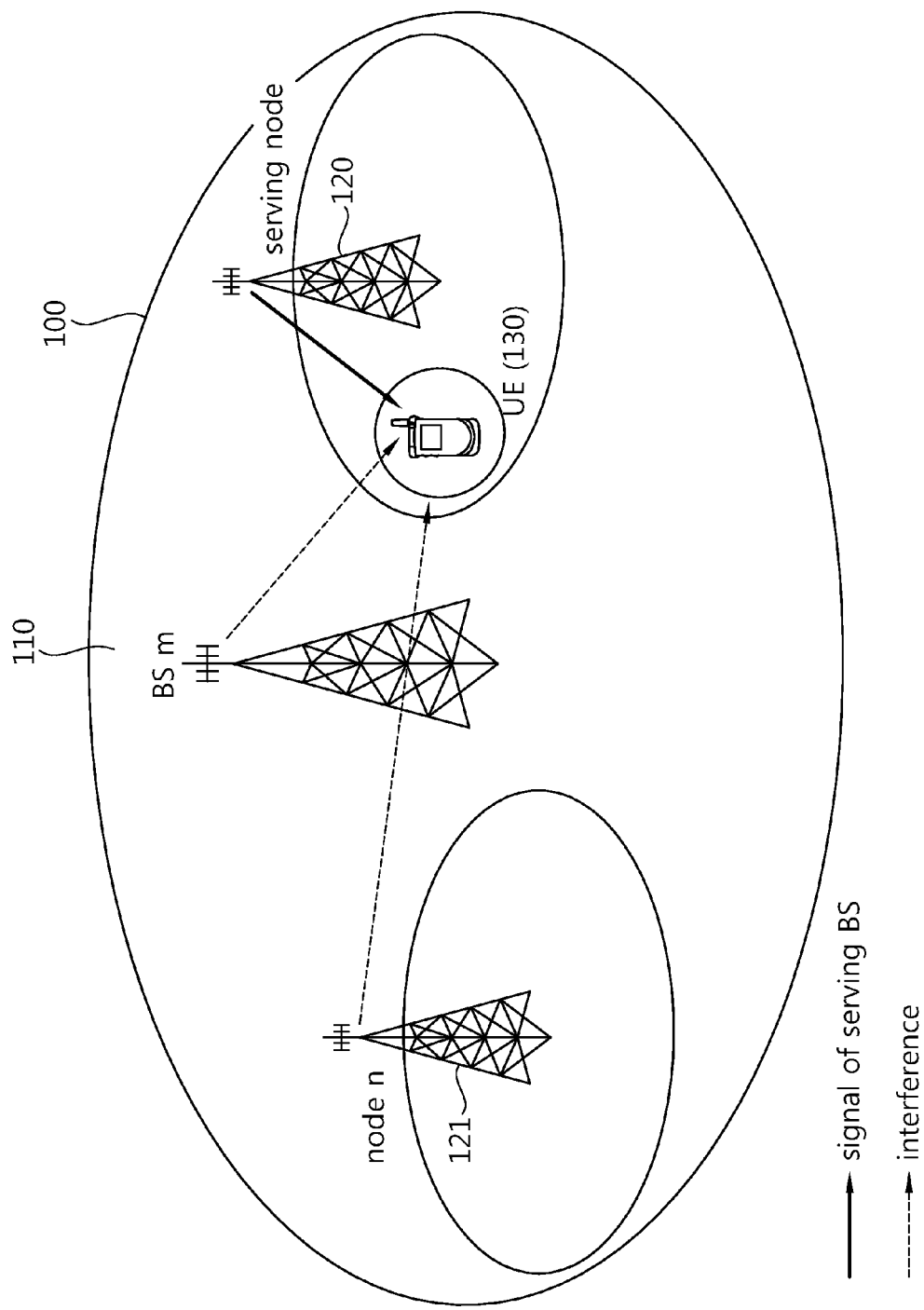
FIG. 7 shows a communication environment to which the CQI reporting method according to an embodiment of the present invention is applied.

FIG. 7 shows a communication environment to which the CQI reporting method according to an embodiment of the present invention is applied.

Referring to FIG. 7, a multi-node system 100 includes one BS m 110 and multiple nodes, i.e. a serving node 120 and a node n 121, which are connected to the BS m 110. The serving node 120 is a node for providing a service to a UE 130. Therefore, the BS m 110 and the node n 121 act as interference to the UE 130.

Figure 8:
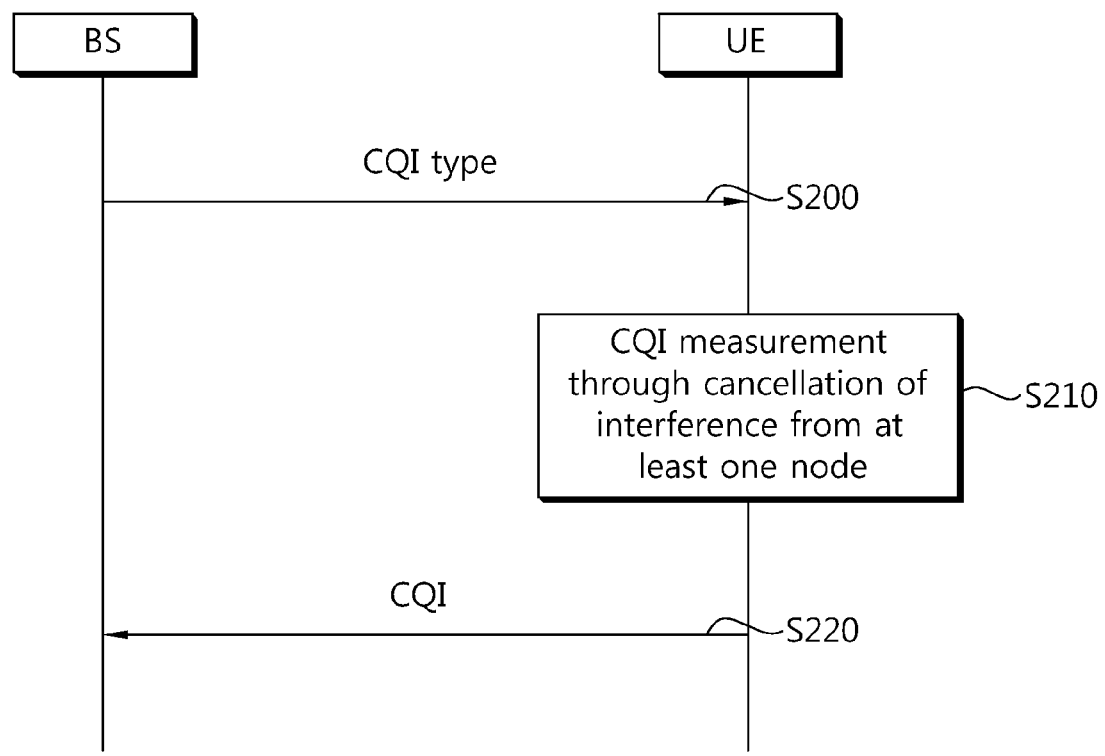
FIG. 8 shows an example of a CQI reporting method according to an embodiment of the present invention.

FIG. 8 shows an example of a CQI reporting method according to an embodiment of the present invention.

In step S200, a BS defines a CQI type of a UE by distinguishing a case where an ICI reduction technique is applied and an otherwise case, and transmits the defined CQI type to the UE. The CQI type may be indicated by a 1-bit indicator. For example, if a value of the indicator is 0, the conventional CQI (i.e., CQI type 1) calculated by Equation 2 may be indicated, and if the value of the indicator is 1, a CQI (i.e., CQI type 2) calculated by applying interference power converted by the ICI reduction technique may be indicated. The indicator may be increased in size if the number of CQI types is increased.

In step S210, the UE calculates the CQI according to the received CQI type. In step S220, the UE reports the calculated CQI to the BS. If the CQI type is 1, the CQI may be calculated by the existing Equation 2 and then be reported. If the CQI type is 2, a total sum of interference power $\Sigma I$ in Equation 2 may be changed. That is, interference power which is changed when the ICI reduction technique is applied is considered in the CQI calculation.

The CQI reporting method proposed in FIG. 8 is applied to FIG. 7 in the following manner. The UE 130 may cancel interference from at least one cell on the basis of the applied ICI reduction technique and then may measure the CQI. For example, if an influence of the BS m 110 which acts as the greatest interference to the UE 130 is removed by the applied ICI reduction technique, a total sum of interference power is $\Sigma I - I_m$ in Equation 2. If each interference from the node n 121 and the BS m 110 which act as the greatest interference to the UE 130 is decreased by 3 dB (i.e., ½) according to the applied ICI reduction technique, a total sum of interference $$\sum I - \frac{(I_m + I_n)}{2}$$

power is in Equation 2.

As such, the BS may configure the defined two CQI types according to a situation, and may receive a feedback of a CQI to be measured from the UE and thus may increase transmission efficiency by immediately changing a modulation order of a received packet or data.

Meanwhile, there may be a case where the BS cannot signal the CQI type to the UE. In this case, the BS may recalculate the CQI calculated by the conventional method by receiving a feedback from the UE. Accordingly, the BS may immediately apply a change depending on the application of the ICI reduction technique to configure a modulation order of a packet.

Figure 9:
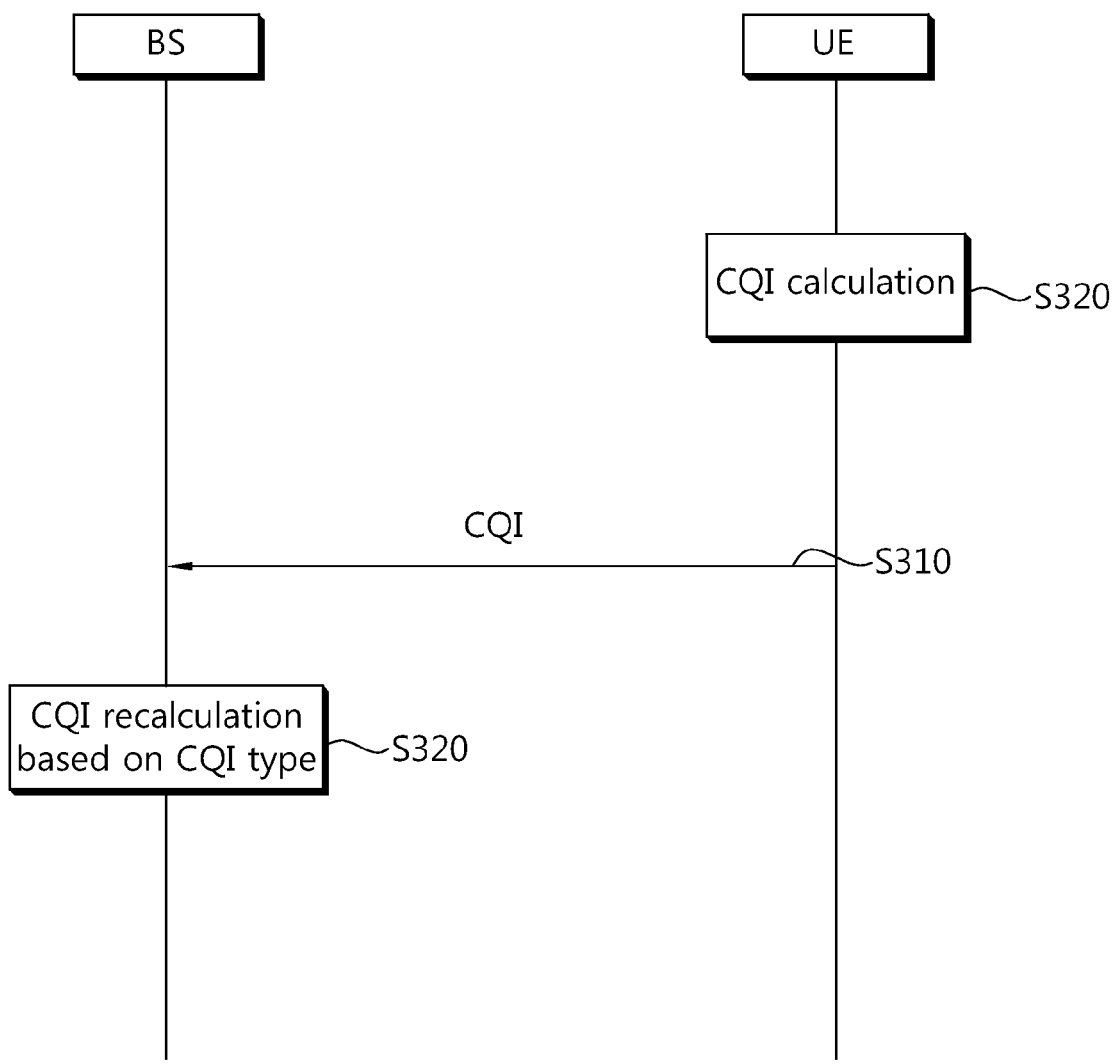
FIG. 9 shows an example of a CQI recalculation method according to an embodiment of the present invention.

FIG. 9 shows an example of a CQI recalculation method according to an embodiment of the present invention.

A UE calculates a CQI in step S300, and transmits the calculated CQI to a BS in step S310. The BS recalculates the received CQI in step S320.

Several methods may be applied when the BS recalculates the received CQI.

1) An offset may be collectively applied to the received CQI. That is, the offset is collectively applied to a CQI which is fed back in a situation where the ICI reduction technique is applied. For example, if the ICI reduction technique is applied when CQIs received from a UE1, a UE2, and a UE3 in a cell are respectively denoted by $CQI_1$, $CQI_2$, and $CQI_3$, a final CQI recalculated by the BS is $CQI_1=f(SINR_1+\alpha_1)$, $CQI_2=f(SINR_2+\alpha_2)$, and $CQI_3=f(SINR_3+\alpha_3)$. In this case, $\alpha_1=\alpha_2=\alpha_3$.

2) A different offset may be applied to a CQI received from each UE. That is, the different offset is applied to a CQI which is fed back from each UE in a situation where the ICI reduction technique is applied. For example, if the ICI reduction technique is applied when CQIs received from the UE1, the UE2, and the UE3 in the cell are respectively $CQI_1$, $CQI_2$, and $CQI_3$, a final CQI recalculated by the BS is $CQI_1=f(SINR_1+\alpha_1)$, $CQI_2=f(SINR_2+\alpha_2)$, and $CQI_3=f(SINR_3+\alpha_3)$, where $\alpha_1 \neq \alpha_2 \neq \alpha_3$. In this case, the offset applied to the CQI received from each UE may be determined on the basis of link quality between UEs. RSRP, a modulation and coding scheme (MCS) level, etc., may be used as the link quality.

3) A different offset may be applied according to a type of a serving BS of a UE which transmits a CQI. For example, if the serving BS is a pico BS or a macro BS, a different offset may be set to each BS. If the ICI reduction technique is applied when a CQI received from a pico UE served by the pico BS is denoted by $CQI_{pico}$, and a CQI received from a macro UE served by the macro BS is denoted by $CQI_{macro}$, the final CQI recalculated by the BS is $CQI_{pico}=f(SINR_{pico}+\alpha_1)$, $QI_{macro}=f(SINR_{macro}+\alpha_2)$. Herein, $\alpha_1=\alpha_2$ or $\alpha_1 \neq \alpha_2$.

Alternatively, the UE may determine the CQI type, calculate the CQI based on this, and report this to the BS. For this, the BS may signal to the UE whether to apply the ICI reduction technique. The UE calculates the CQI on the basis of whether to apply the ICI reduction technique and reports the calculated CQI to the BS. In this case, a 1-bit CQI indicator indicating the CQI type may be transmitted together. For example, if a value of the CQI indicator is 0, the conventional method may be used to calculate the CQI, and if the value of the CQI indicator is 1, the CQI may be calculated by reducing interference from at least one node. This can be expressed by Equation 3.

$$CQI = f(RSRQ') = f\left(\frac{RSRP}{RSSI'}\right) = f\left(\frac{S}{I' + N_0}\right), \quad \langle \text{Equation 3} \rangle$$

$$I' \neq \sum I$$

The BS confirms the CQI type according to the CQI indicator received from the UE, and processes the received CQI.

Table 1 shows an example of a CQI type based on a value of a CQI indicator if the CQI indicator consists of 2 bits.

TABLE 1

| CQI Indicator | Contents | CQI type |
| --- | --- | --- |
| 00 | The existing CQI | $CQI = f\left(\dfrac{S}{\sum I + N_0}\right)$ |
| 01 | Considering one strongest interference | $CQI = f\left(\dfrac{S}{\sum I - I_1 + N_0}\right)$ |
| 10 | Considering two strongest interferences | $CQI = f\left(\dfrac{S}{\sum I - I_1 - I_2 + N_0}\right)$ |
| 11 | Considering the half of two strongest interferences | $CQI = f\left(\dfrac{S}{\sum I - \dfrac{I_1 + I_2}{2} + N_0}\right)$ |

Figure 10:
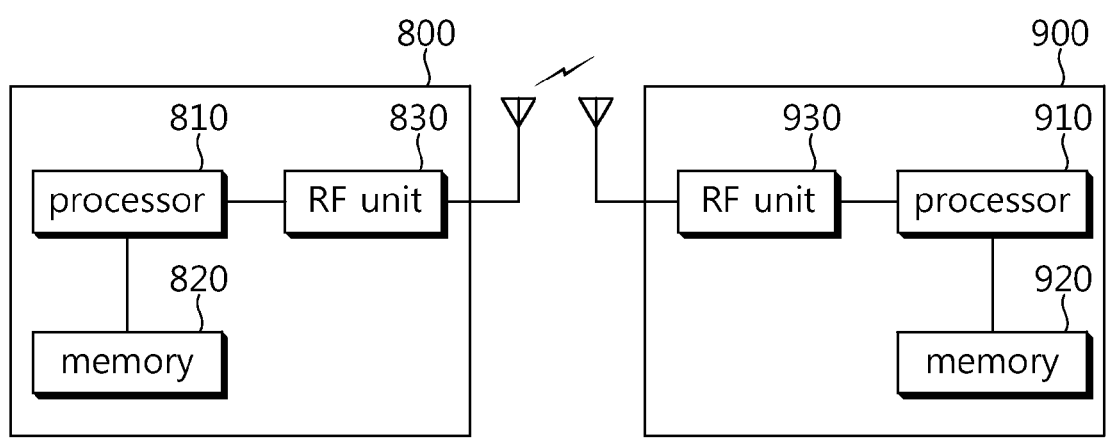
FIG. 10 is a block diagram showing a wireless communication system to implement an embodiment of the present invention.

FIG. 10 is a block diagram showing a wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of reporting a channel quality indicator (CQI) by a user equipment in a multi-node system, the method comprising:

measuring the CQI on the basis of final interference power in which an interference from at least one node, among a plurality of nodes from which the user equipment receives a signal, is reduced; and reporting the measured CQI to a base station, wherein the at least one node of which the interference is reduced is two nodes which cause the strongest interferences to the user equipment, and wherein the final interference power in which the interferences of the two nodes are reduced is $$\sum I - \frac{(I_m + I_n)}{2},$$

where $\Sigma I$ is total interference power from the plurality of nodes and $I_m$, $I_n$ are respective interferences of the two nodes.

2. The method of claim 1, further comprising:

receiving from the base station a CQI indicator indicating whether to apply an inter-cell interference (ICI) reduction technique.

3. The method of claim 2, wherein the CQI indicator is 1 bit.

* * * * *